US010800217B2

(12) United States Patent
Rogan (10) Patent No.: US 10,800,217 B2
(45) Date of Patent: Oct. 13, 2020

(54) HITCH ASSIST SYSTEM

(71) Applicant: Ford Global Technologies, LLC, Dearborn, MI (US)

(72) Inventor: Douglas Rogan, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 16/055,230

(22) Filed: Aug. 6, 2018

(65) Prior Publication Data

US 2020/0039306 A1 Feb. 6, 2020

(51) Int. Cl.
*B60D 1/36* (2006.01)
*B62D 15/02* (2006.01)
*G05D 1/02* (2020.01)
*B60R 1/00* (2006.01)
*B60W 30/06* (2006.01)

(52) U.S. Cl.
CPC ............... *B60D 1/36* (2013.01); *B60R 1/003* (2013.01); *B62D 15/0285* (2013.01); *G05D 1/0274* (2013.01); *B60W 30/06* (2013.01); *B60W 2300/123* (2013.01); *B60W 2420/52* (2013.01); *G05D 1/0212* (2013.01); *G05D 1/0238* (2013.01); *G05D 1/0257* (2013.01)

(58) Field of Classification Search
CPC ...... B60D 1/36; B60R 1/003; B62D 15/0285; G05D 1/0274; G05D 1/0212; G05D 1/0238; G05D 1/0257; B60W 30/06; B60W 2300/123; B60W 2420/52
See application file for complete search history.

(56) References Cited

U.S. PATENT DOCUMENTS

| 6,480,104 | B1 | 11/2002 | Wall et al. |
| 6,970,184 | B2 | 11/2005 | Hirama et al. |
| 9,102,271 | B2 | 8/2015 | Trombley et al. |
| 9,499,018 | B2 | 11/2016 | Gehrke et al. |
| 2013/0226390 | A1 | 8/2013 | Luo et al. |
| 2016/0375831 | A1* | 12/2016 | Wang ............... B62D 15/0295 348/148 |
| 2018/0312022 | A1* | 11/2018 | Mattern ............... G05D 1/0225 |

* cited by examiner

*Primary Examiner* — Kevin Hurley
*Assistant Examiner* — Marlon A Arce
(74) *Attorney, Agent, or Firm* — Raymond Coppiellie; Price Heneveld LLP (57) ABSTRACT

A hitch assist system is provided herein that includes a sensing system configured to detect a trailer proximate a vehicle. The hitch assist system also includes a controller for determining an environmental visibility level; determining an offset from a first sensor in high visibility levels and from a second sensor in low visibility levels; and maneuvering the vehicle along a path to align a hitch ball with a coupler of the trailer.

16 Claims, 8 Drawing Sheets

HITCH ASSIST SYSTEM

FIELD OF THE INVENTION

The present disclosure generally relates to autonomous and semi-autonomous vehicle systems, and more particularly, to hitch assist systems that facilitate the hitching of a vehicle to a trailer.

BACKGROUND OF THE INVENTION

The process of hitching a vehicle to a trailer can be difficult, especially to those lacking experience. Accordingly, there is a need for a system that simplifies the process by assisting a user in a simple yet intuitive manner.

SUMMARY OF THE INVENTION

According to some aspects of the present disclosure, a hitch assist system is provided herein. The hitch assist system includes a sensing system configured to detect a trailer proximate a vehicle. The hitch assist system further includes a controller for determining an environmental visibility level; determining an offset from a first sensor in high visibility levels and from a second sensor in low visibility levels; and controlling the vehicle along a path to align a hitch ball with a coupler of the trailer.

According to some aspects of the present disclosure, a hitch assist method is provided herein. The method includes determining an environmental visibility level. The method also includes determining an offset from a first sensor in high visibility levels and from a second sensor in low visibility levels. The method further includes localizing and mapping two or more points relative to one another indicative of a trailer. Lastly, the method includes controlling a vehicle along a path to align a hitch ball with a coupler of the trailer.

According to some aspects of the present disclosure, a hitch assist system is provided herein. The hitch assist system includes a sensor configured to operate in a substantially similar accuracy during high and low visibility conditions. The hitch assist system further includes a controller for localizing and mapping objects proximate a vehicle in response to sensor signals provided by the sensor and maneuvering the vehicle along a path to align a hitch ball with a coupler of a trailer.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
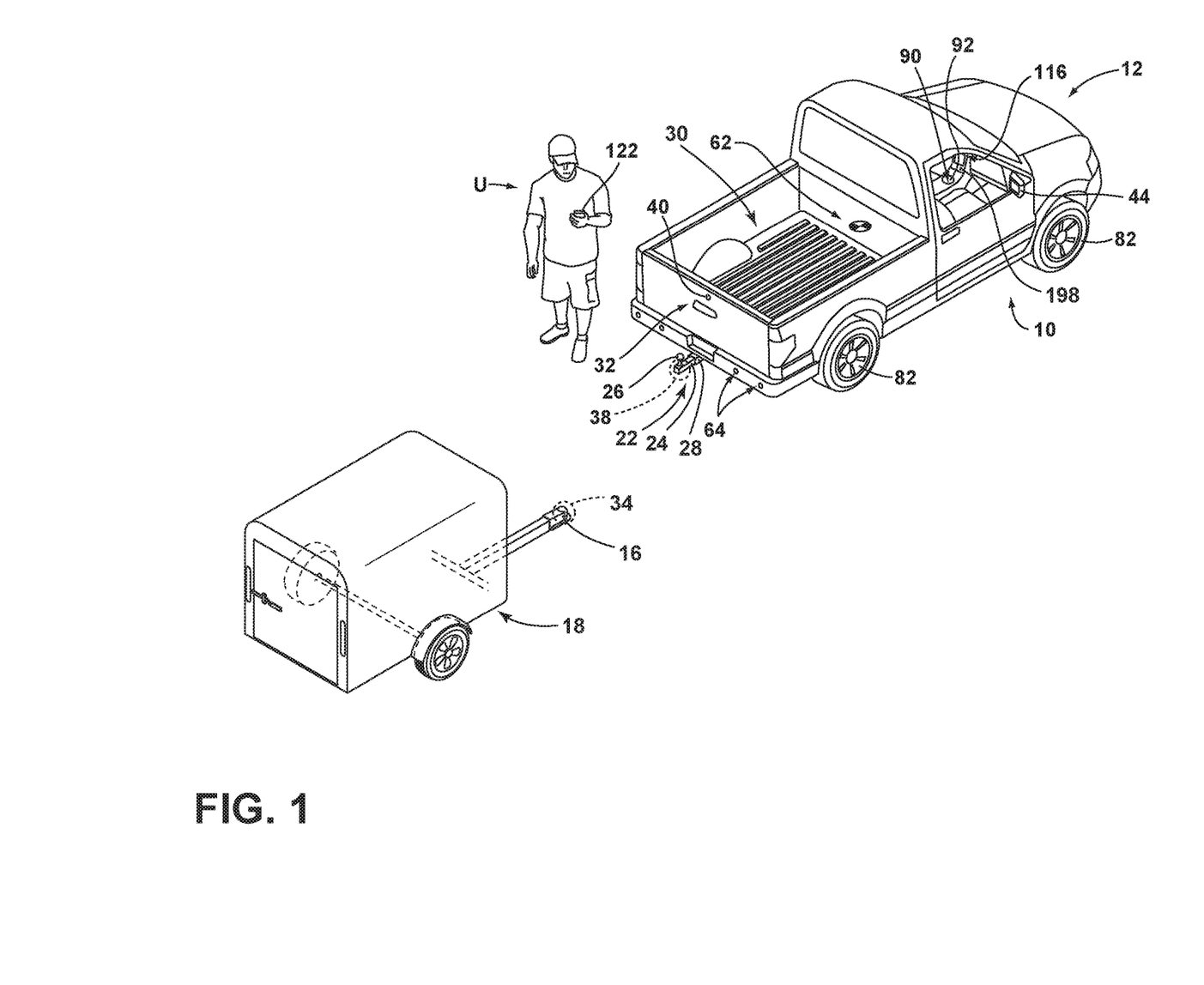
FIG. 1 is a top perspective view of a vehicle and a trailer, the vehicle being equipped with a hitch assistance system (also referred to as a "hitch assist" system), according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, "visibility" is a measure of the distance at which an object or light can be clearly discerned. Accordingly, a low visibility condition may exist whenever the object or light is indiscernible from a threshold distance and a high visibility condition may exist whenever the object or light is discernible from the threshold distance. The object may be indiscernible due to night-like conditions (i.e., lower light level conditions) and/or atmospheric perturbations such as fog, rain, or any other particles in suspension that degrade the ability to discern an object from the threshold distance.

The following disclosure describes a hitch assist system for a vehicle. The hitch assist system may include a sensing system for detecting a coupler of a trailer proximate the vehicle and a controller for generating a vehicle path to align the vehicle with the coupler and/or moving the vehicle along the path. The sensing system may include a radio detection and ranging (radar) sensor, or other sensor, capable of producing repeatable and/or accurate proximity data during high and low visibility conditions. In some instances, the controller may determine an environmental visibility level; determine an offset from a first sensor in high visibility levels and from a second sensor in low visibility levels; and control the vehicle along a path to align a hitch ball with the coupler of the trailer.

Figure 2:
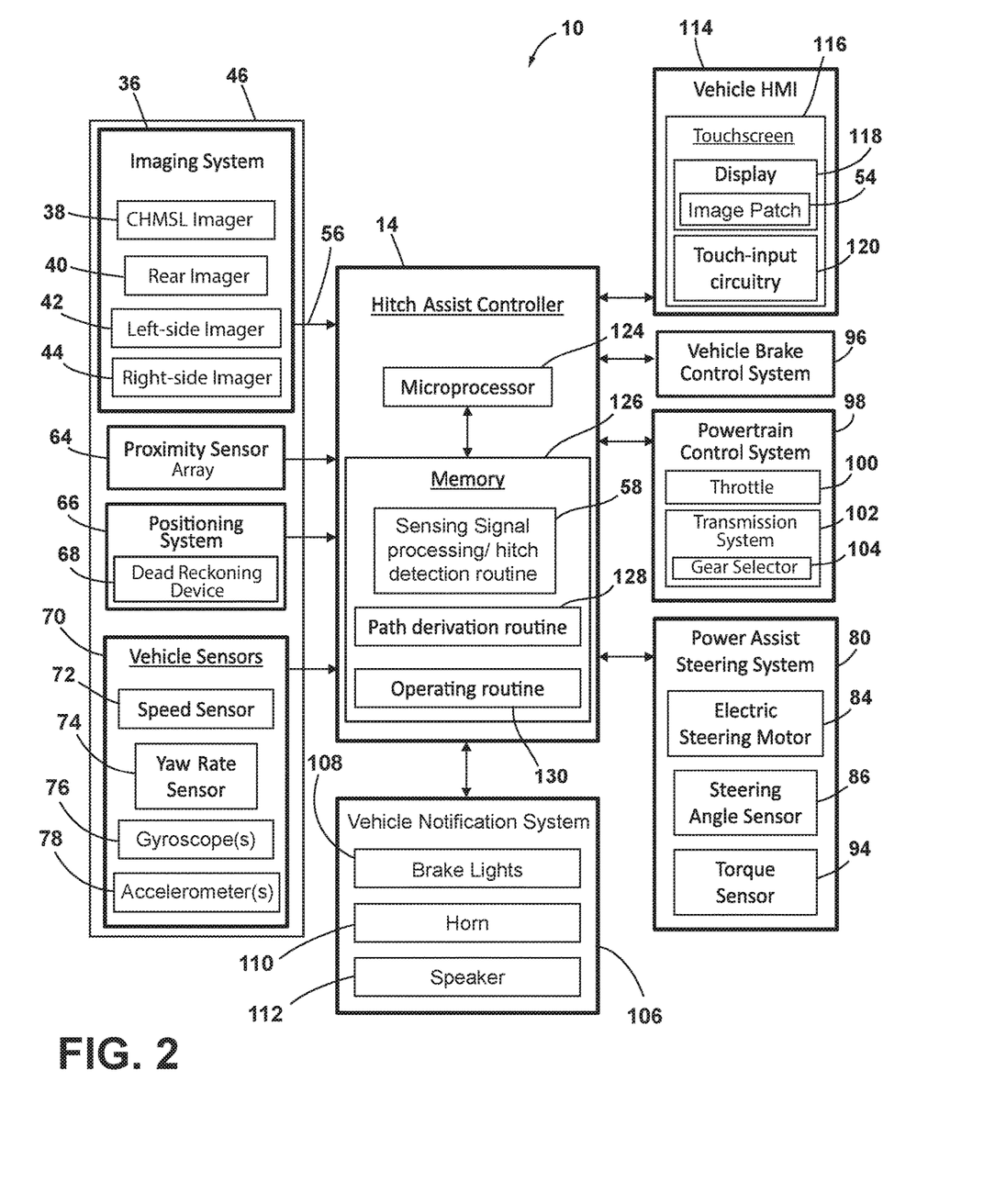
FIG. 2 is a block diagram illustrating various components of the hitch assist system, according to some examples.

Referring to FIGS. 1 and 2, reference numeral 10 designates a hitch assist system for a vehicle 12. In particular, the hitch assist system 10 includes a controller 14 acquiring position data of a coupler 16 of a trailer 18 and deriving a vehicle path 20 (FIG. 3) to align a hitch assembly 22 of the vehicle 12 with the coupler 16. In some examples, the hitch assembly 22 may include a ball mount 24 supporting a hitch ball 26. The hitch ball 26 may be fixed on the ball mount 24 that extends from the vehicle 12 and/or the hitch ball 26 may be fixed to a portion of the vehicle 12, such as a bumper of the vehicle 12. In some examples, the ball mount 24 may couple with a receiver 28 that is fixed to the vehicle 12.

As shown in FIG. 1, the vehicle 12 is exemplarily embodied as a pickup truck having a truck bed 30 that is accessible via a rotatable tailgate 32. The hitch ball 26 may be received by a hitch coupler 16 in the form of a coupler ball socket 34 that is provided at a terminal end portion of the trailer coupler 16. The trailer 18 is exemplarily embodied as a single axle trailer from which the coupler 16 extends longitudinally. It will be appreciated that additional examples of the trailer 18 may alternatively couple with the vehicle 12 to provide a pivoting connection, such as by connecting with a fifth wheel connector. It is also contemplated that additional examples of the trailer 18 may include more than one axle and may have various shapes and sizes configured for different loads and items, such as a boat trailer or a flatbed trailer without departing from the teachings provided herein.

With respect to the general operation of the hitch assist system 10, as illustrated in FIG. 2, the hitch assist system 10 includes a sensing system 46 that includes various sensors and devices that obtain or otherwise provide vehicle status-related information. For example, in some instances, the sensing system 46 incorporates an imaging system 36 that includes one or more exterior imagers 38, 40, 42, 44, or any other vision-based device. The one or more imagers 38, 40, 42, 44 each include an area-type image sensor, such as a CCD or a CMOS image sensor, and image-capturing optics that capture an image of an imaging field of view (e.g., fields of view 48, 50, 52a, 52b, FIG. 5) defined by the image-capturing optics. In some instances, the one or more imagers 38, 40, 42, 44 may derive an image patch 54 from multiple image frames that may be shown on a display 118. In various examples, the hitch assist system 10 may include any one or more of a center high-mount stop light (CHMSL) imager 38, a rear imager 40, a left-side side-view imager 42, and/or a right-side side-view imager 44, although other arrangements including additional or alternative imagers are possible without departing from the scope of the present disclosure.

In some examples, the imaging system 36 can include the rear imager 40 alone or can be configured such that the hitch assist system 10 utilizes only the rear imager 40 in a vehicle 12 with the multiple exterior imagers 38, 40, 42, 44. In some instances, the various imagers 38, 40, 42, 44 included in the imaging system 36 can be positioned to generally overlap in their respective fields of view, which in the depicted arrangement of FIG. 5 includes fields of view 48, 50, 52a, 52b to correspond with the CHMSL imager 38, the rear imager 40, and the side-view imagers 42 and 44, respectively. In this manner, image data 56 from two or more of the imagers 38, 40, 42, 44 can be combined in an image/signal processing routine 58, or in another dedicated image/signal processor within the imaging system 36, into a single image or image patch 54. In an extension of such examples, the image data 56 can be used to derive stereoscopic image data 56 that can be used to reconstruct a three-dimensional scene of the area or areas within overlapped areas of the various fields of view 48, 50, 52a, 52b, including any objects (e.g., obstacles or the coupler 16) therein.

In some examples, the use of two images including the same object can be used to determine a location of the object relative to the two imagers 38, 40, 42, and/or 44, given a known spatial relationship between the imagers 38, 40, 42, 44 through projective geometry of the imagers 38, 40, 42, 44. In this respect, the image/signal processing routine 58 can use known programming and/or functionality to identify an object within the image data 56 from the various imagers 38, 40, 42, 44 within the imaging system 36. The image/signal processing routine 58 can include information related to the positioning of any of the imagers 38, 40, 42, 44 present on the vehicle 12 or utilized by the hitch assist system 10, including relative to a center 62 (FIG. 1) of the vehicle 12. For example, the positions of the imagers 38, 40, 42, 44 relative to the center 62 of the vehicle 12 and/or to each other can be used for object positioning calculations and to result in object position data relative to the center 62 of the vehicle 12, for example, or other features of the vehicle 12, such as the hitch ball 26 (FIG. 1), with known positions relative to the center 62 of the vehicle 12 in a manner similar to that which is described in commonly assigned U.S. patent application Ser. No. 15/708,427, filed Sep. 19, 2017, now U.S. Pat. No. 10,363,874, and entitled "HITCH ASSIST SYSTEM WITH HITCH COUPLER IDENTIFICATION FEATURE AND HITCH COUPLER HEIGHT ESTIMATION," the entire disclosure of which is incorporated by reference herein.

With further reference to FIGS. 1 and 2, a proximity sensor 64 or an array thereof, and/or other vehicle sensors 70, may provide sensor signals that the controller 14 of the hitch assist system 10 processes with various routines to determine various objects proximate the vehicle 12, the trailer 18, and/or the coupler 16 of the trailer 18. The proximity sensor 64 may also be utilized to determine a height and position of the coupler 16. The proximity sensor 64 may be configured as any type of sensor, such as an ultrasonic sensor, a radio detection and ranging (radar) sensor, a sound navigation and ranging (SONAR) sensor, a light detection and ranging (LIDAR) sensor, a vision-based sensor, and/or any other type of sensor known in the art.

Figure 3:
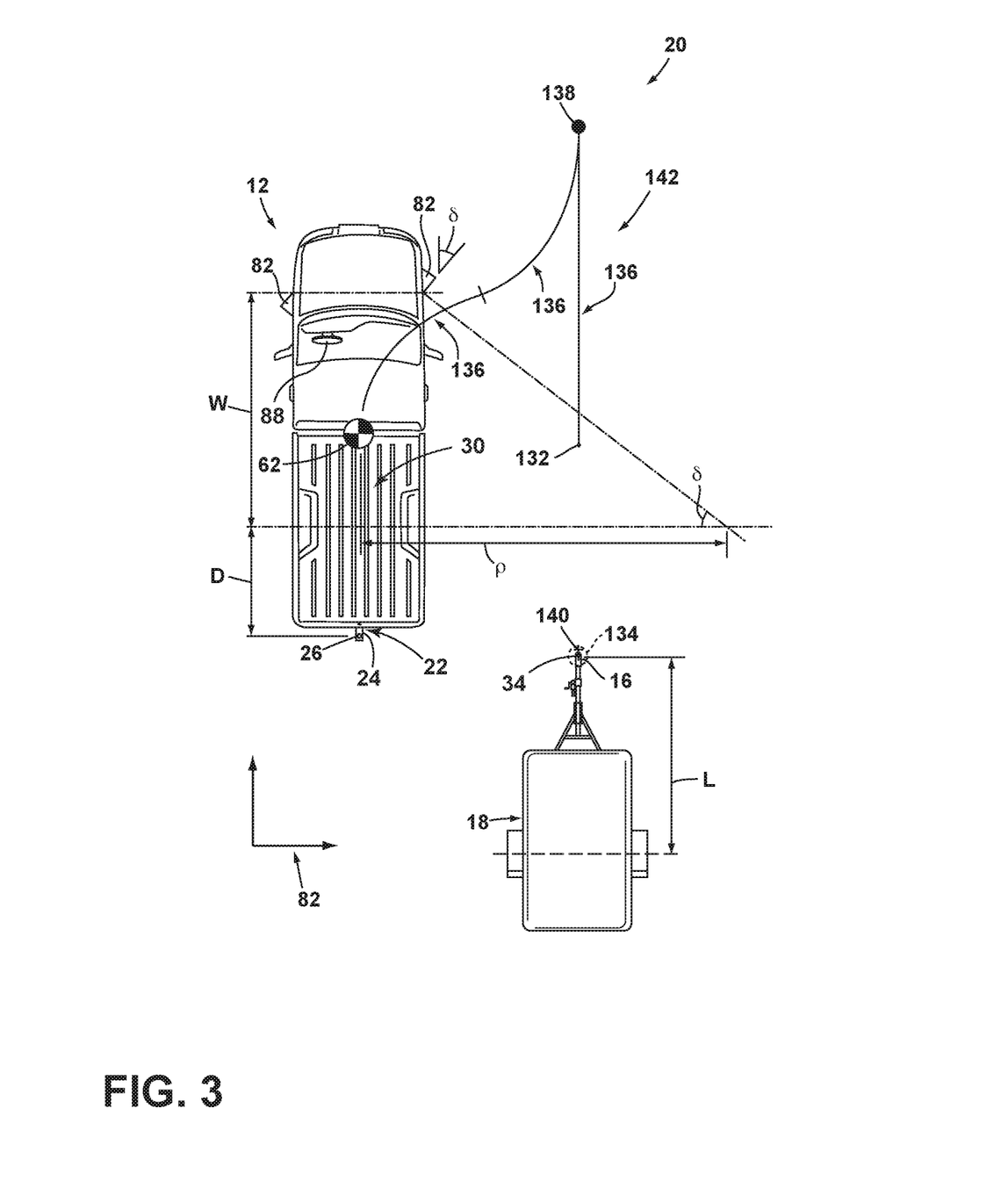
FIG. 3 is an overhead schematic view of the vehicle during a step of the alignment sequence with the trailer, according to some examples.
Figure 4:
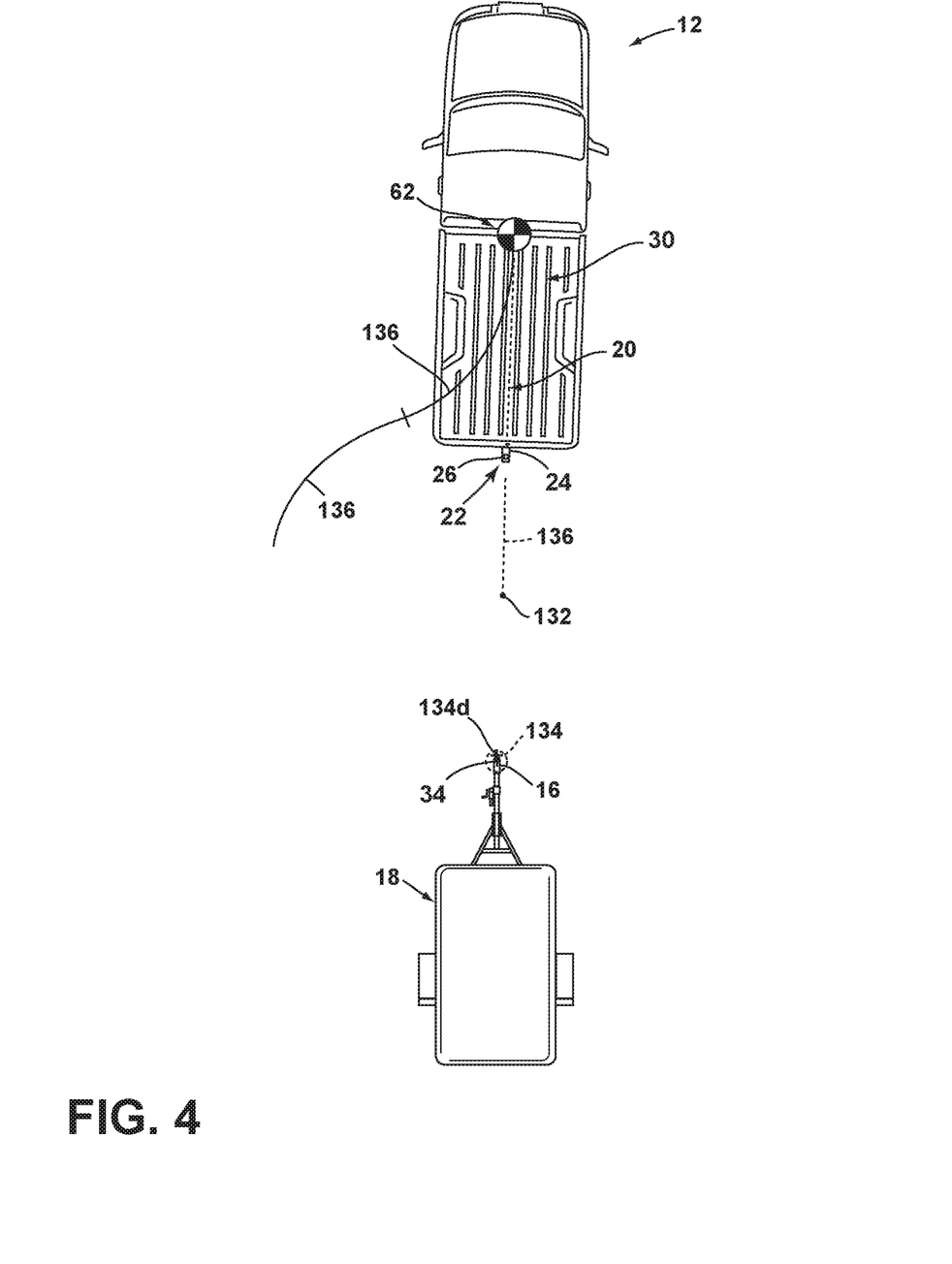
FIG. 4 is an overhead schematic view of the vehicle during a subsequent step of the alignment sequence with the trailer, according to some examples.

Referring still to FIGS. 1 and 2, a positioning system 66, may include a dead reckoning device 68 or, in addition, or as an alternative, a global positioning system (GPS) that determines a coordinate location of the vehicle 12. For example, the dead reckoning device 68 can establish and track the coordinate location of the vehicle 12 within a localized coordinate system based at least on vehicle speed and/or steering angle δ (FIG. 3). The controller 14 may also be operably coupled with various vehicle sensors 70, such as a speed sensor 72 and a yaw rate sensor 74. Additionally, the controller 14 may communicate with one or more gyroscopes 76 and accelerometers 78 to measure the position, orientation, direction, and/or speed of the vehicle 12.

To enable autonomous or semi-autonomous control of the vehicle 12, the controller 14 of the hitch assist system 10 may be further configured to communicate with a variety of vehicle systems. According to some examples, the controller 14 of the hitch assist system 10 may control a power assist steering system 80 of the vehicle 12 to operate the steered road wheels 82 of the vehicle 12 while the vehicle 12 moves along a vehicle path 20. The power assist steering system 80 may be an electric power-assisted steering (EPAS) system that includes an electric steering motor 84 for turning the steered road wheels 82 to a steering angle δ based on a steering command generated by the controller 14, whereby the steering angle δ may be sensed by a steering angle sensor 86 of the power assist steering system 80 and provided to the controller 14. As described herein, the steering command may be provided for autonomously steering the vehicle 12 during a maneuver and may alternatively be provided manually via a rotational position (e.g., a steering wheel angle) of a steering wheel 88 (FIG. 3) or a steering input device 90, which may be provided to enable a driver to control or otherwise modify the desired curvature of the path 20 of vehicle 12. The steering input device 90 may be communicatively coupled to the controller 14 in a wired or wireless manner and provides the controller 14 with information defining the desired curvature of the path 20 of the vehicle 12. In response, the controller 14 processes the information and generates corresponding steering commands that are supplied to the power assist steering system 80 of the vehicle 12. In some examples, the steering input device 90 includes a rotatable knob 92 operable between a number of rotated positions that each provides an incremental change to the desired curvature of the path 20 of the vehicle 12.

In some examples, the steering wheel 88 of the vehicle 12 may be mechanically coupled with the steered road wheels 82 of the vehicle 12, such that the steering wheel 88 moves in concert with steered road wheels 82 via an internal torque during autonomous steering of the vehicle 12. In such instances, the power assist steering system 80 may include a torque sensor 94 that senses torque (e.g., gripping and/or turning) on the steering wheel 88 that is not expected from the autonomous control of the steering wheel 88 and therefore is indicative of manual intervention by the driver. In some examples, the external torque applied to the steering wheel 88 may serve as a signal to the controller 14 that the driver has taken manual control and for the hitch assist system 10 to discontinue autonomous steering functionality. However, as provided in more detail below, the hitch assist system 10 may continue one or more functions/operations while discontinuing the autonomous steering of the vehicle.

The controller 14 of the hitch assist system 10 may also communicate with a vehicle brake control system 96 of the vehicle 12 to receive vehicle speed information such as individual wheel speeds of the vehicle 12. Additionally or alternatively, vehicle speed information may be provided to the controller 14 by a powertrain control system 98 and/or the vehicle speed sensor 72, among other conceivable means. The powertrain control system 98 may include a throttle 100 and a transmission system 102. A gear selector 104 may be disposed within the transmission system 102 that controls the mode of operation of the vehicle transmission system 102 through one or more gears of the transmission system 102. In some examples, the controller 14 may provide braking commands to the vehicle brake control system 96, thereby allowing the hitch assist system 10 to regulate the speed of the vehicle 12 during a maneuver of the vehicle 12. It will be appreciated that the controller 14 may additionally or alternatively regulate the speed of the vehicle 12 via interaction with the powertrain control system 98.

Through interaction with the power assist steering system 80, the vehicle brake control system 96, and/or the powertrain control system 98 of the vehicle 12, the potential for unacceptable conditions can be reduced when the vehicle 12 is moving along the path 20. Examples of unacceptable conditions include, but are not limited to, a vehicle overspeed condition, sensor failure, and the like. In such circumstances, the driver may be unaware of the failure until the unacceptable backup condition is imminent or already happening. Therefore, it is disclosed herein that the controller 14 of the hitch assist system 10 can generate an alert signal corresponding to a notification of an actual, impending, and/or anticipated unacceptable backup condition, and prior to driver intervention, generate a countermeasure to prevent such an unacceptable backup condition.

According to some examples, the controller 14 may communicate with one or more devices, including a vehicle notification system 106, which may prompt visual, auditory, and tactile notifications and/or warnings. For instance, vehicle brake lights 108 and/or vehicle emergency flashers may provide a visual alert. A vehicle horn 110 and/or speaker 112 may provide an audible alert. Additionally, the controller 14 and/or vehicle notification system 106 may communicate with a user-input device, such as a humanmachine interface (HMI) 114 of the vehicle 12. The HMI 114 may include a touchscreen 116, or other user-input device, such as a navigation and/or entertainment display 118 mounted within a cockpit module, an instrument cluster, and/or any other location within the vehicle 12, which may be capable of displaying images, indicating the alert.

In some instances, the HMI 114 further includes an input device, which can be implemented by configuring the display 118 as a portion of the touchscreen 116 with circuitry 120 to receive an input corresponding with a location over the display 118. Other forms of input, including one or more joysticks, digital input pads, or the like can be used in place or in addition to touchscreen 116.

Further, the hitch assist system 10 may communicate via wired and/or wireless communication with some instances of the HMI 114 and/or with one or more handheld or portable devices 122 (FIG. 1), which may additionally and/or alternatively be configured as the user-input device. The network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The portable device 122 may also include the display 118 for displaying one or more images and other information to a user U. For instance, the portable device 122 may display one or more images of the trailer 18 on the display 118 and may be further able to receive remote user inputs via touchscreen circuitry 120. In addition, the portable device 122 may provide feedback information, such as visual, audible, and tactile alerts. It will be appreciated that the portable device 122 may be any one of a variety of computing devices and may include a processor and memory. For example, the portable device 122 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

The controller 14 is configured with a microprocessor 124 and/or other analog and/or digital circuitry for processing one or more logic routines stored in a memory 126. The logic routines may include one or more routines including the image/signal processing routine 58, a hitch detection routine, a path derivation routine 128, and an operating routine 130. Information from the imager 40 or other components of the sensing system 46 can be supplied to the controller 14 via a communication network of the vehicle 12, which can include a controller area network (CAN), a local interconnect network (LIN), or other protocols used in the automotive industry. It will be appreciated that the controller 14 may be a stand-alone dedicated controller or may be a shared controller integrated with the imager 40 or other component of the hitch assist system 10 in addition to any other conceivable onboard or off-board vehicle control systems.

The controller 14 may include any combination of software and/or processing circuitry suitable for controlling the various components of the hitch assist system 10 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

With further reference to FIGS. 2-6, the controller 14 may generate vehicle steering information and commands as a function of all or a portion of the information received. Thereafter, the vehicle steering information and commands may be provided to the power assist steering system 80 for effecting the steering of the vehicle 12 to achieve a commanded path 20 of travel for alignment with the coupler 16 of the trailer 18. It will further be appreciated that the image/signal processing routine 58 may be carried out by a dedicated processor, for example, within a stand-alone imaging system 36 for the vehicle 12 that can output the results of its image/signal processing to other components and systems of vehicle 12, including the microprocessor 124. Further, any system, computer, processor, or the like that completes image/signal processing functionality, such as that described herein, may be referred to herein as an "image/signal processor" regardless of other functionality it may also implement (including simultaneously with executing the image/signal processing routine 58).

In some examples, the image/signal processing routine 58 can be programmed or otherwise configured to locate the coupler 16 within the image data 56. In some instances, the image/signal processing routine 58 can identify the coupler 16 within the image data 56 based on stored or otherwise known visual characteristics of the coupler 16 or hitches in general. In some instances, a marker in the form of a sticker or the like may be affixed with trailer 18 in a specified position relative to coupler 16 in a manner similar to that which is described in commonly assigned U.S. Pat. No. 9,102,271, entitled "TRAILER MONITORING SYSTEM AND METHOD," the entire disclosure of which is incorporated by reference herein. In such examples, the image/signal processing routine 58 may be programmed with identifying characteristics of the marker for location in the image data 56, as well as the positioning of the coupler 16 relative to such a marker so that the location of the coupler 16 can be determined based on the marker location. Additionally or alternatively, the controller 14 may seek confirmation of the coupler 16, via a prompt on the touchscreen 116 and/or the portable device 122. If the coupler 16 determination is not confirmed, further image/signal processing may be provided, or user-adjustment of the position 134 of the coupler 16 may be facilitated, either using the touchscreen 116 or another input to allow the user U to move the depicted position 134 of the coupler 16 on the touchscreen 116, which the controller 14 uses to adjust the determination of the position 134 of the coupler 16 with respect to the vehicle 12 based on the above-described use of the image data 56. Alternatively, the user U can visually determine the position 134 of the coupler 16 within an image presented on HMI 114 and can provide a touch input in a manner similar to that which is described in co-pending, commonly-assigned U.S. patent application Ser. No. 15/583,014, filed May 1, 2017, now U.S. Pat. No. 10,266,023, and entitled "SYSTEM TO AUTOMATE HITCHING A TRAILER," the entire disclosure of which is incorporated by reference herein. The image/signal processing routine 58 can then correlate the location of the touch input with the coordinate system applied to the image patch.

As shown in FIGS. 3-6, in some exemplary instances of the hitch assist system 10, the image/signal processing routine 58 and operating routine 130 may be used in conjunction with each other to determine the path 20 along which the hitch assist system 10 can guide the vehicle 12 to align the hitch ball 26 and the coupler 16 of the trailer 18. In the example shown, an initial position of the vehicle 12 relative to the trailer 18 may be such that the coupler 16 is in the field of view 52a of the side imager 42, with the vehicle 12 being positioned latitudinally from the trailer 18 but with the coupler 16 being almost longitudinally aligned with the hitch ball 26. In this manner, upon initiation of the hitch assist system 10, such as by user input on the touchscreen 116, for example, the image/signal processing routine 58 can identify the coupler 16 within the image data 56 of the imager 42 and estimate the position 134 of the coupler 16 relative to the hitch ball 26 using the image data 56 in accordance with the examples discussed above or by other known means, including by receiving focal length information within image data 56 to determine a distance $D_c$ to the coupler 16 and an angle $\alpha_c$ of offset between the coupler 16 and the longitudinal axis of vehicle 12. Once the positioning $D_c$, $\alpha_c$ of the coupler 16 has been determined and, optionally, confirmed by the user U, the controller 14 can take control of at least the vehicle steering system 80 to control the movement of the vehicle 12 along the desired path 20 to align the vehicle hitch ball 26 with the coupler 16.

Continuing with reference to FIG. 3, the controller 14 (FIG. 2), having estimated the positioning $D_c$, $\alpha_c$ of the coupler 16, as discussed above, can, in some examples, execute the path derivation routine 128 to determine the vehicle path 20 to align the vehicle hitch ball 26 with the coupler 16. The controller 14 can store various characteristics of vehicle 12, including a wheelbase W, a distance D from the rear axle to the hitch ball 26, which is referred to herein as the drawbar length, as well as a maximum angle to which the steered wheels 82 can be turned $\delta_{max}$. As shown, the wheelbase W and the current steering angle $\delta$ can be used to determine a corresponding turning radius $\rho$ for the vehicle 12 according to the equation:

$$\rho = \frac{1}{W\tan\delta}, \quad (1)$$

in which the wheelbase W is fixed and the steering angle $\delta$ can be controlled by the controller 14 by communication with the steering system 80, as discussed above. In this manner, when the maximum steering angle $\delta_{max}$ is known, the smallest possible value for the turning radius $\rho_{min}$ is determined as:

$$\rho_{min} = \frac{1}{W\tan\delta_{max}}. \quad (2)$$

The path derivation routine 128 can be programmed to derive the vehicle path 20 to align a known location of the vehicle hitch ball 26 with the estimated position 134 of the coupler 16 that takes into account the determined minimum turning radius $\rho_{min}$, which may allow the path 20 to use the minimum amount of space and maneuvers. In this manner, the path derivation routine 128 can use the position of the vehicle 12, which can be based on the center 62 of the vehicle 12, a location along the rear axle, the location of the dead reckoning device 68, or another known location on the coordinate system, to determine both a lateral distance to the coupler 16 and a forward or rearward distance to coupler 16 and derive the path 20 that achieves lateral and/or forward-backward movement of the vehicle 12 within the limitations of the steering system 80. The derivation of the path 20 further takes into account the positioning of the hitch ball 26 relative to the tracked location of vehicle 12 (which may correspond with the center 62 of mass of the vehicle 12, the location of a GPS receiver, or another specified, known area) to determine the needed positioning of the vehicle 12 to align the hitch ball 26 with the coupler 16.

Once the projected path 20, including the endpoint 132, has been determined, the controller 14 may at least control the steering system 80 of the vehicle 12 with the powertrain control system 98 and the brake control system 96 (whether controlled by the driver or by the controller 14) controlling the speed (forward or rearward) of the vehicle 12. In this manner, the controller 14 can receive data regarding the position of the vehicle 12 during movement thereof from the positioning system 66 while controlling the steering system 80 to maintain the vehicle 12 along the path 20. The path 20, having been determined based on the vehicle 12 and the geometry of steering system 80, can adjust the steering angle $\delta$, as dictated by the path 20, depending on the position of the vehicle 12 therealong.

As illustrated in FIG. 3, the initial positioning of the trailer 18 relative to the vehicle 12 may be such that forward movement of vehicle 12 is needed for the desired vehicle path 20, such as when the trailer 18 is latitudinally offset to the side of vehicle 12. In this manner, the path 20 may include various segments 136 of forward driving and/or rearward driving of the vehicle 12 separated by inflection points 138 at which the vehicle 12 transitions between forward and rearward movement. As used herein, "inflection points" are any point along the vehicle path 20 in which a vehicle condition is changed. The vehicle conditions include, but are not limited to, a change in speed, a change in steering angle $\delta$, a change in vehicle direction, and/or any other possible vehicle condition that may be adjusted. For example, if a vehicle speed is altered, an inflection point 138 may be at the location where the speed was altered. In some examples, the path derivation routine 128 can be configured to include a straight backing segment 136 for a defined distance before reaching the point at which the hitch ball 26 is aligned with the position 134 of the coupler 16. The remaining segments 136 can be determined to achieve the lateral and forward/backward movement within the smallest area possible and/or with the lowest number of overall segments 136 or inflection points 138. In the illustrated example of FIG. 3, the path 20 can include two segments 136 that collectively traverse the lateral movement of the vehicle 12, while providing a segment 136 of straight rearward backing to bring the hitch ball 26 into an offset position 134 of the coupler 16, one of which includes forward driving with a maximum steering angle $\delta_{max}$ in the rightward-turning direction and the other including forward driving with a maximum steering angle $\delta_{max}$ in the leftward-turning direction. Subsequently, an inflection point 138 is included in which the vehicle 12 transitions from forward driving to rearward driving followed by the previously-mentioned straight rearward backing segment 136. It is noted that variations in the depicted path 20 may be used, including a variation with a single forward-driving segment 136 at a rightward steering angle $\delta$ less than the maximum steering angle $\delta_{max}$, followed by an inflection point 138 and a rearward driving segment 136 at a maximum leftward steering angle $\delta_{max}$ with a shorter straight backing segment 136, with still further paths 20 being possible.

In some instances, the hitch assist system 10 may be configured to operate with the vehicle 12 in reverse only, in which case, the hitch assist system 10 can prompt the driver to drive vehicle 12, as needed, to position the trailer 18 in a designated area relative to the vehicle 12, including to the rear thereof so that path derivation routine 128 can determine a vehicle path 20 that includes rearward driving. Such instructions can further prompt the driver to position the vehicle 12 relative to the trailer 18 to compensate for other limitations of the hitch assist system 10, including a particular distance for identification of the coupler 16, a minimum offset angle $\alpha_c$, or the like. It is further noted that the estimates for the positioning $D_c$, $\alpha_c$ of the coupler 16 may become more accurate as the vehicle 12 traverses the path 20, including to position the vehicle 12 in front of the trailer 18 and as the vehicle 12 approaches the coupler 16. Accordingly, such estimates can be derived and used to update the path derivation routine 128, if desired, in the determination of the adjusted initial endpoint 132 for the path 20.

Figure 5:
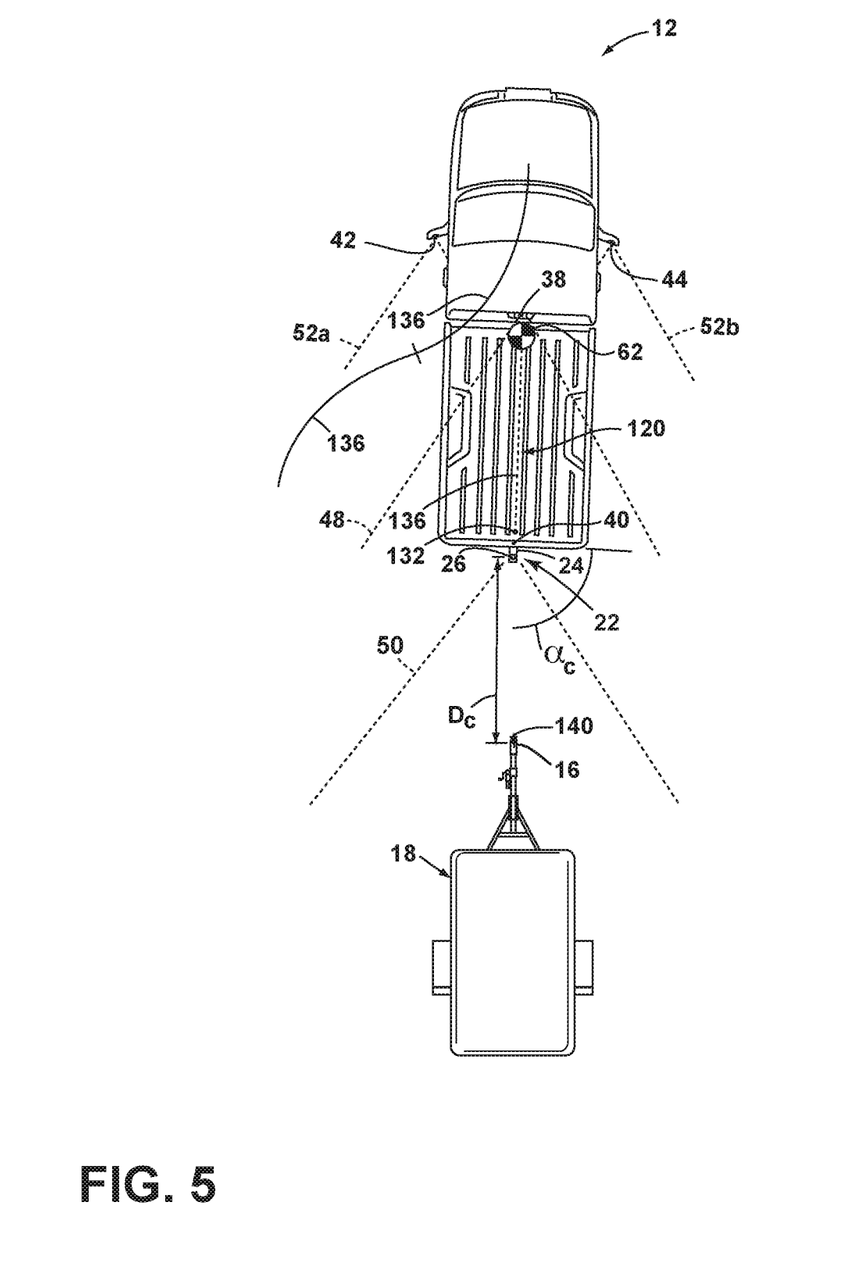
FIG. 5 is an overhead schematic view of the vehicle during a subsequent step of the alignment sequence with the trailer, according to some examples.
Figure 6:
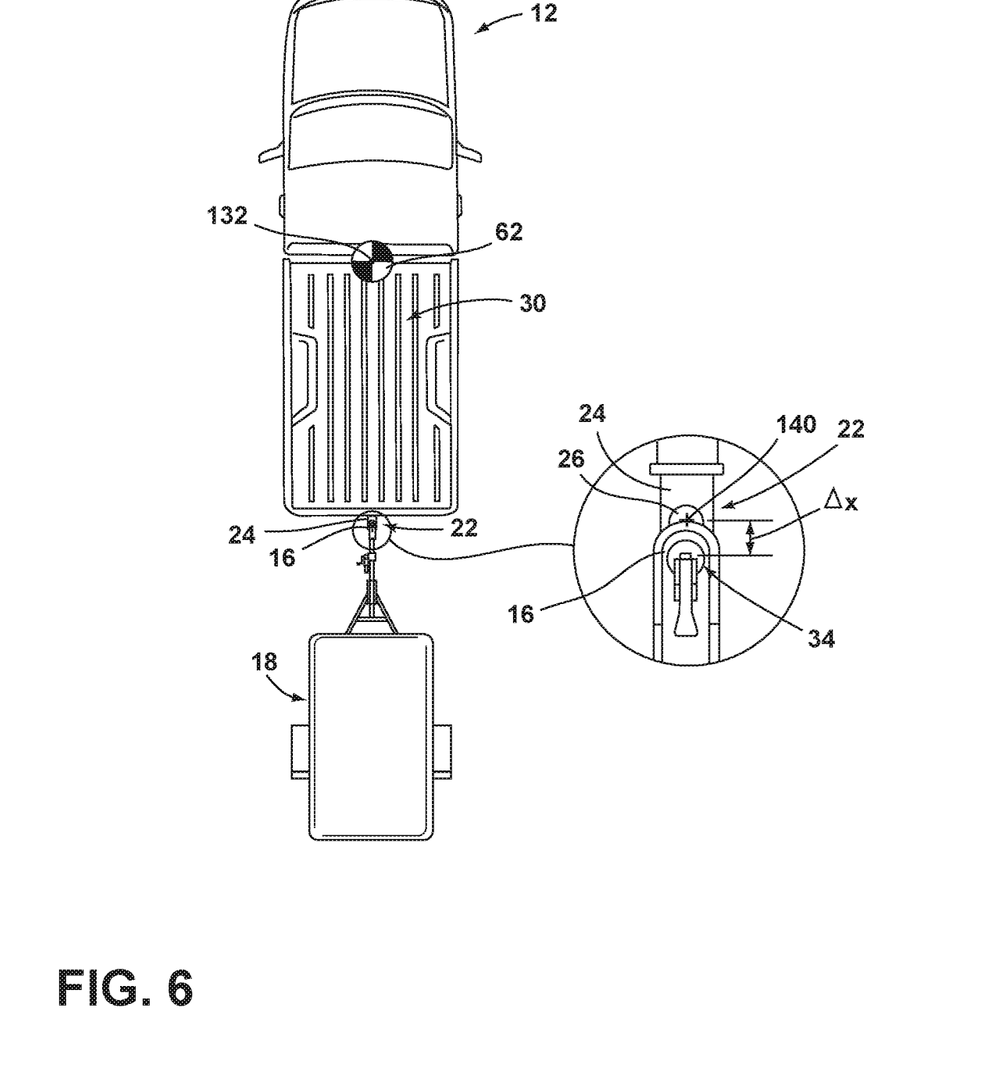
FIG. 6 is an overhead schematic view of the vehicle during a subsequent step of the alignment sequence with the trailer and showing the position of a hitch ball of the vehicle at an end of a derived alignment path, according to some examples.

Referring to FIGS. 5 and 6, a strategy for determining an initial endpoint 132 for the vehicle path 20 that places hitch ball 26 in a projected position for alignment with the coupler 16 involves calculating the actual or an approximate trajectory for movement of the coupler 16 while lowering the coupler 16 onto the hitch ball 26. The initial endpoint 132 is then derived, as discussed above or otherwise, to place hitch ball 26 at the desired location 140 on that trajectory. In effect, such a scheme is implemented by determining the difference between the height $H_c$ of the coupler 16 and the height $H_b$ of the hitch ball 26, which represents the vertical distance by which coupler 16 will be lowered to engage with hitch ball 26. The determined trajectory is then used to relate the vertical distance with a corresponding horizontal distance $\Delta x$ of coupler 16 movement in the driving direction that results from the vertical distance. This horizontal distance $\Delta x$ can be input into the path derivation routine 128 as the desired initial endpoint 132 thereof or can be applied as an offset to the initial endpoint 132 derived from the initially determined position 134 of the coupler 16 when the path 20 ends with the straight-backing segment 136, as illustrated in FIG. 3.

Referring again to FIGS. 5 and 6, the operating routine 130 may continue to guide the vehicle 12 until the hitch ball 26 is in the desired final endpoint 140 relative to the coupler 16 for the coupler 16 to engage with the hitch ball 26 when the coupler 16 is lowered into alignment and/or engagement therewith. In the examples discussed above, the image/signal processing routine 58 monitors the positioning $D_c$, $\alpha_c$ of the coupler 16 during execution of the operating routine 130, including as the coupler 16 comes into clearer view of the rear imager 40 with continued movement of the vehicle 12 along the path 20. As discussed above, the position of the vehicle 12 can also be monitored by the dead reckoning device 68 with the position 134 of the coupler 16 being updated and fed into the path derivation routine 128 in case the path 20 and or the initial endpoint 132 can be refined or should be updated (due to, for example, improved height $H_c$, distance $D_c$, or offset angle $\alpha_c$ information due to closer resolution or additional image data 56), including as the vehicle 12 moves closer to the trailer 18. In some instances, the coupler 16 can be assumed static such that the position of the vehicle 12 can be tracked by continuing to track the coupler 16 to remove the need for use of the dead reckoning device 68. In a similar manner, a modified variation of the operating routine 130 can progress through a predetermined sequence of maneuvers involving steering of the vehicle 12 at or below a maximum steering angle $\delta_{max}$, while tracking the position $D_c$, $\alpha_c$ of the coupler 16 to converge the known relative position of the hitch ball 26 to the desired final endpoint 140 thereof relative to the tracked position 134 of the coupler 16.

Figures 7, 8:
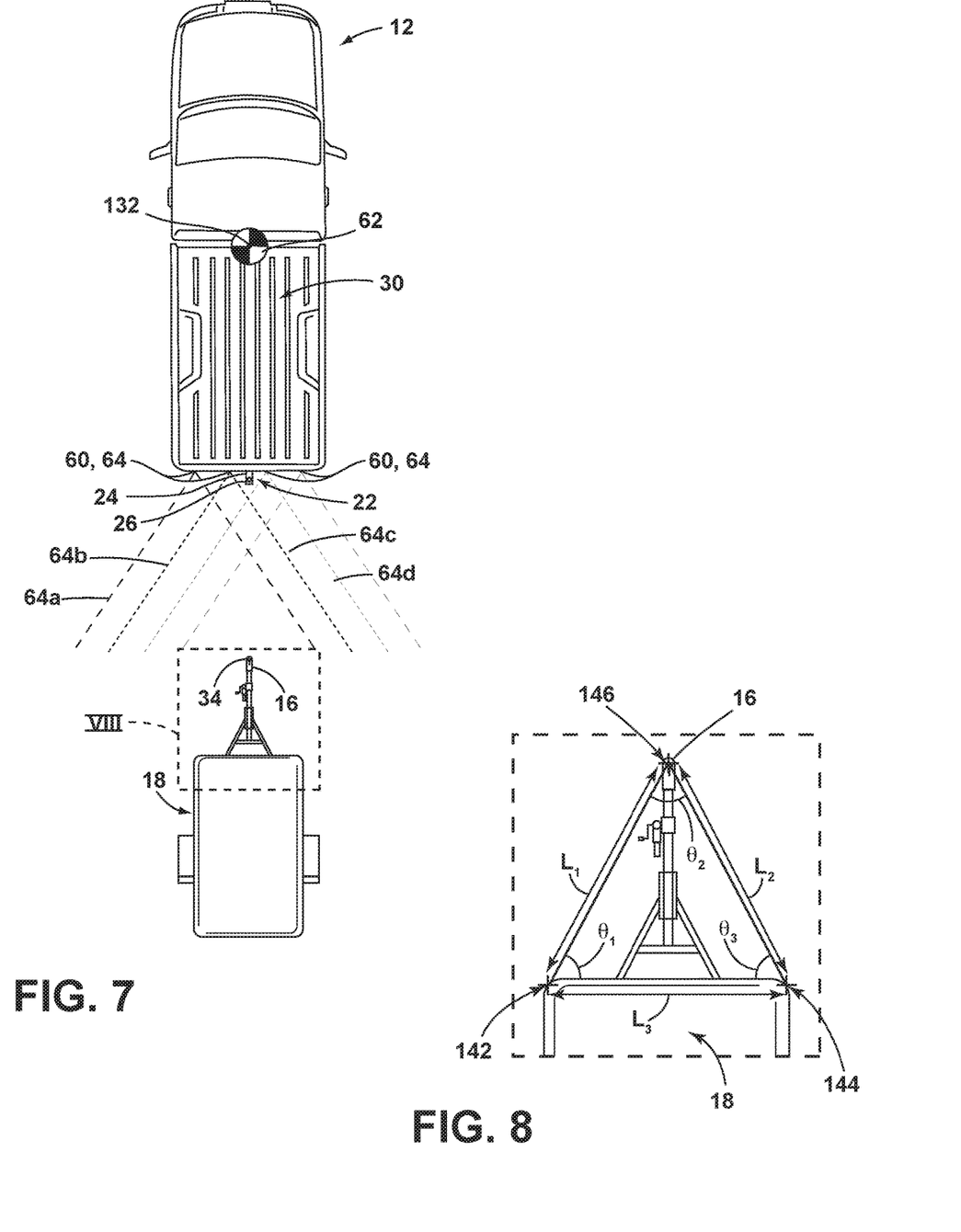
FIG. 7 is an overhead schematic view of the vehicle separated from the trailer, according to some examples.
FIG. 8 is an enhanced view of area VIII of FIG. 7.

Referring to FIGS. 7 and 8, in some environments, snow, rain and/or other obscurants may lessen the accuracy of vehicle sensors that operate at about 500 THz or a wavelength in the 400 to 900 μm size range, such as imagers 38, 40, 42, 44, as the waves produced by such sensors may be blocked by the obscurants. Accordingly, in some examples, the hitch assist system 10 may utilize various other proximity sensors, such as radar sensors 60 that can operate successfully through most snow, rain or dust without substantial effect because the wavelength is longer than the obscurant particles to detect the trailer 18 and/or the coupler 16. The proximity sensors may also be used to detect other various objects proximate the vehicle 12 during operation of the hitch assist system 10 prior to and/or during any hitch assist operations. It will be appreciated that any other sensor capable of providing information to the hitch assist system 10 during high and/or low visibility conditions may be used in conjunction with or in lieu of the radar sensor 60.

In general, the radar sensors 60 operate by transmitting radio signals and detecting reflections off objects. In some examples, the radar sensors 60 may be used to detect physical objects, such as the trailer 18 (or portions of the trailer 18), the coupler 16, other vehicles, landscapes (such as trees, cliffs, rocks, hills, or the like), road edges, signs, buildings, or other objects. The radar sensors 60 may use reflected radio waves to determine a size, shape, distance, surface texture, or other information about a physical object or material. For example, the radar sensors 60 may sweep an area to obtain data or objects within a range and viewing angle of the radar sensors 64. In some examples, the radar sensors 60 are configured to generate perception information from a region near the vehicle 12, such as one or more regions nearby or surrounding the rear portion of the vehicle 12. In some examples, the radar sensors 60 may provide perception data including a two dimensional or three-dimensional map or model to the hitch assist system 10 for reference or processing. Moreover, radar sensors 60 can operate in some of the most severe and adverse weather conditions and/or in night-like conditions with little or no degradation in the quality or accuracy of perception data. For example, wet surfaces, snow, and fog may have little impact on an ability of the radar sensors 60 to accurately locate and detect ranges to objects. Accordingly, in some instances, the radar sensors 60 may be used as a secondary detection system in high visibility environments and as a primary detection system when the vehicle 12 is operated in a low visibility environment.

In some examples, through usage of the sensing system 46, the hitch assist system 10 may be configured to perform simultaneous localization and mapping (SLAM) from the sensor signals to determine the position and the alignment of the vehicle 12 relative to the trailer 18 and/or the coupler 16. SLAM is understood in the present disclosure as a problem in which initially both the position and the alignment of the vehicle 12 are unknown relative to the trailer 18, and/or any other obstacle. When solving the SLAM problem, the position and alignment of the vehicle 12 and the position of the trailer 18 and/or the coupler 16 may be determined simultaneously.

In some examples, the various proximity sensors included in the sensing system 46 can be positioned to generally overlap in their respective fields of view, which in the depicted arrangement of FIG. 7 includes fields of view 64a, 64b, 64c, 64d. In this manner, sensor signals from two or more of the proximity sensors 64 can be combined in the image/signal processing routine 58, or in another dedicated image/signal processor within the sensing system 46, into a global frame. In an extension of such examples, the sensor signals can be used to derive stereoscopic data that can be used to reconstruct a three-dimensional scene of the area or areas within overlapped areas of the various fields of view 64a, 64b, 64c, 64d, including any objects (e.g., obstacles or the coupler 16) therein.

In some instances, the trailer 18 may include a pair of points 142, 144 that correspond with front outer corners, or other outer shapes, of the trailer 18. The hitch coupler 16 may be centrally disposed between the pair of points 142, 144 or outer corners at a forward portion 146 of the trailer 18. Accordingly, the hitch assist system 10 may detect these points 142, 144, or any other desired points, that may be commonly found on the trailer 18 and therefore recognizable within the SLAM problem. Once these points 142, 144 are determined, recognized, localized, and/or mapped relative a global frame that may be based off the center 62 of the vehicle 12, or any other coordinate system, the length $L_1$ from the coupler 16 to a first point 142 or corner, the length $L_2$ from the coupler 16 to a second point 144 or corner, and the length $L_3$ between the first and second points 142, 144 or corners can be used to determine a shape of the trailer 18, a coupler position, and/or a heading direction of the trailer 18 relative the vehicle 12 according to the equations:

$$L_1^2 = L_2^2 + L_3^2 - 2L_2L_3 \cos \theta_1, \quad (3)$$

$$L_2^2 = L_1^2 + L_3^2 - 2L_1L_3 \cos \theta_2, \text{ and} \quad (4)$$

$$L_3^2 = L_1^2 + L_2^2 - 2L_1L_2 \cos \theta_3. \quad (5)$$

Figure 9:
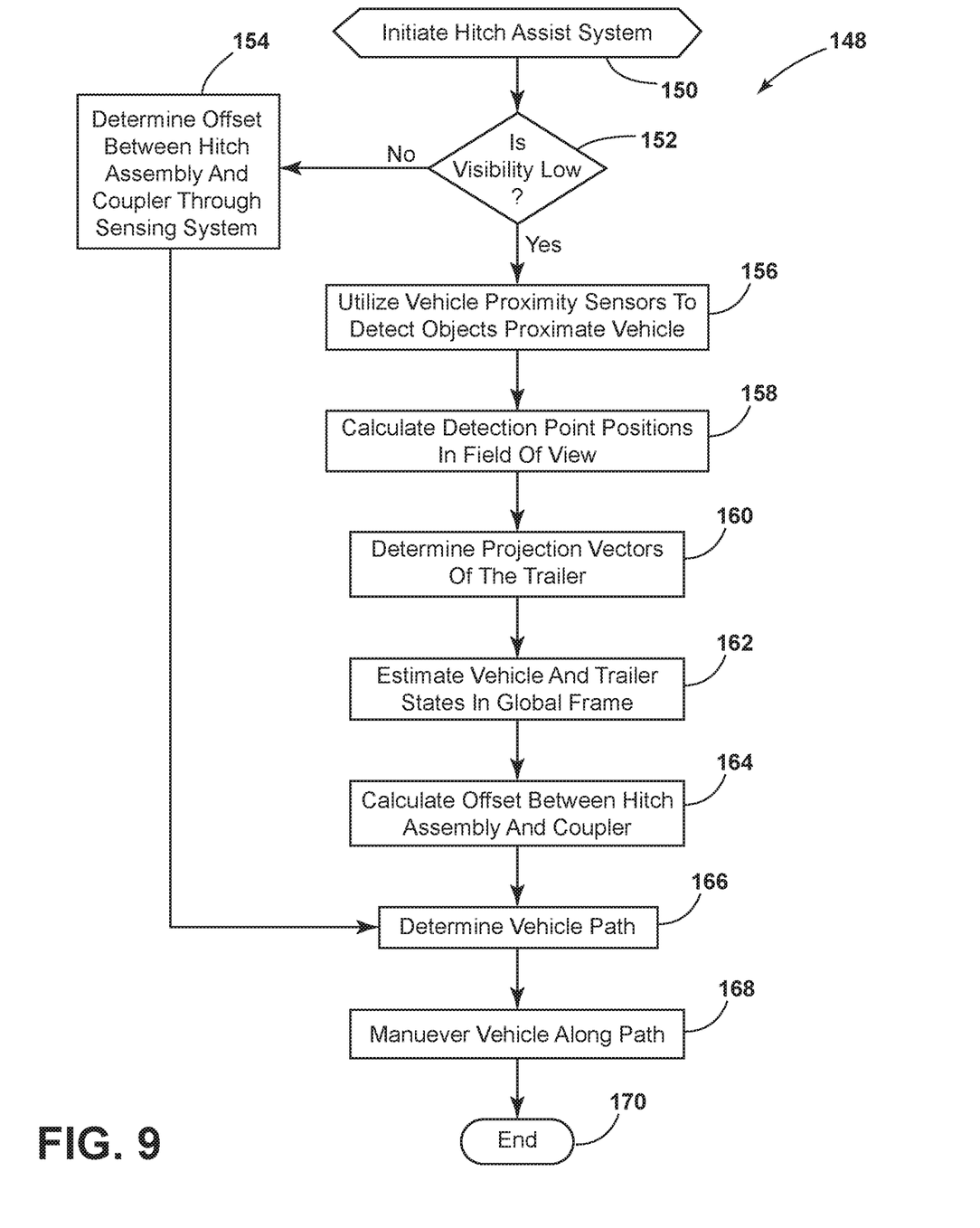
FIG. 9 is a flowchart of an operating routine of the hitch assist system based on environmental visibility levels, according to some examples.

Referring to FIG. 9, an operating routine 148 of aligning the hitch assembly 22 with the coupler 16 is shown, according to some examples. In particular, at step 150, the hitch assist system 10 is initiated. Upon initiation of the hitch assist system 10, the sensing system 46 may be used to determine an environmental visibility level surrounding the vehicle 12 at step 152. The environmental visibility level may be detected by any sensor known in the art, including, but not limited to, any imager disposed on the vehicle 12.

In instances in which a low environmental visibility condition does not exist, the routine continues to step 154 where an offset of the coupler 16 relative to the hitch assembly 22 is determined using data from the sensing system 46, which may include the available image data 56 and using the image processing routine 58. In some instances, the user U (such as by way of the HMI 114) may confirm the coupler 16.

In instances in which a low environmental visibility condition does exist, the routine continues to step 156, where one or more proximity sensors on the vehicle 12 provide sensor measurements regarding the position of objects in the fields of view 64a, 64b, 64c, 64d (FIG. 7) of the proximity sensors based on the detection points 142, 144 in the sensor signals. The sensor signals are provided to the controller 14 at step 158 for map building and/or localization/navigation. Map building uses the measurements from the proximity sensors to measure and estimate the location of objects in the field of view of the proximity sensors using techniques known to one of ordinary skill in the art. Localization/navigation estimates the kinematic state of the vehicle 12 and object positions in the global frame using techniques known to one of skill in the art. For example, in some examples, an extended Kalman filter is used to blend measurements from different sensors to estimate the kinematic state of the vehicle 12. The different sensors can include, but are not limited to, different types of radar sensors 64, as mentioned above, which provide measurements of the kinematic state of the vehicle 12. As used herein, the kinematic state of the vehicle 12 refers to the vehicle's position, velocity, attitude (three-dimensional orientation), and/or angular velocity. A global frame is a reference frame that is based on the center 62 of the vehicle 12.

Once objects proximate the vehicle 12 are detected and mapped, as provided herein, through a SLAM process, or any other practicable method, the hitch assist system 10 attempts to distinguish points 142, 144 indicative of a trailer 18 and/or a coupler 16 within the collected measurements. For example, as discussed herein, the pair of points 142, 144 or corners of the trailer 18 may be equally laterally spaced from the coupler 16 forming a triangular pattern. This pattern may be indicative of a trailer 18 and thereby distinguished by the hitch assist system 10. Such a pattern may be used to calculate one or more characteristics of the trailer 18, such as a trailer heading direction and/or a position of the coupler 16.

At step 160, projection vectors are formed between detected positions or points 142, 144 in the global frame. For example, projection vectors are formed between positions of at least three points 142, 144 (and coupler 16) indicative of the trailer 18. The projection vectors may be indicative of the length of the coupler 16, the position of the coupler 16, and/or the heading direction of the coupler 16.

At step 162, the point 142, 144 positions are calculated in the global frame by resolving the estimated object positions relative the vehicle 12 in the global frame. As step 164, the positions of the trailer 18 and/or the coupler 16 and the vehicle 12 are used to determine an offset between the hitch assembly 22 and the coupler 16. Once the offset is determined at step 154 or step 164, the path derivation routine 128 can be used to determine the vehicle path 20 to align the hitch ball 26 with the coupler 16 at step 166. In this manner, the controller 14 uses the path derivation routine 128 to determine the path 20 to align the hitch ball 26 with the coupler 16 in an overlapping position over hitch ball 26. Once the path 20 has been derived, the hitch assist system 10 can ask the user U to relinquish control of at least the steering wheel 88 of vehicle 12 (and, optionally, the throttle 100 and brake, in various implementations of the hitch assist system 10 wherein the controller 14 assumes control of the powertrain control system 98 and the brake control system 96 during execution of the operating routine 130) while the vehicle 12 performs an auto hitch operation at step 168. When it has been confirmed that user U is not attempting to control steering system 80 (for example, using the torque sensor 94), the controller 14 begins to move vehicle 12 along the determined path 20. Furthermore, the hitch assist system 10 may determine if the transmission system 102 is in the correct gear and may shift to the desired gear or prompt the user U to shift to the desired gear. The hitch assist system 10 may then control the steering system 80 to maintain the vehicle 12 along the path 20 as either the user U or the controller 14 controls the speed of vehicle 12 using the powertrain control system 98 and the braking control system 96. Once hitch ball 26 is aligned with the coupler 16, the operating routine 130 ends at step 170.

A variety of advantages may be derived from the use of the present disclosure. For example, use of the disclosed hitch assist system provides a system for utilizing the hitch assist system in both high and low visibility conditions. In some instances, multiple sensors may produce three-dimensional data of an area surrounding the vehicle to provide a more accurate environment of the surrounding area. Moreover, based on the simultaneous localization and mapping of the area surrounding the vehicle, the hitch assist system may be able to detect multiple points indicative of a trailer. In response, the hitch assist system may give a user of the vehicle the option to determine a path upon which a hitch assembly of the vehicle is aligned with the coupler of the trailer.

According to various examples, a hitch assist system is provided herein. The hitch assist system includes a sensing system configured to detect a trailer proximate a vehicle. The hitch assist system further includes a controller for determining an environmental visibility level; determining an offset from a first sensor in high visibility levels and from a second sensor in low visibility levels; and controlling the vehicle along a path to align a hitch ball with a coupler of the trailer. Examples of the hitch assist system can include any one or a combination of the following features:
    the first sensor is an imager and the second sensor is a proximity sensor;
    the proximity sensor is a radio detection and ranging (radar) sensor;
    the second sensor is disposed within a vehicle bumper and has a field of view rearwardly of the vehicle;

the controller uses sensor signals from the second sensor to conduct a simultaneous localization and mapping (SLAM) process of an area proximate the vehicle;

the SLAM process is configured to locate one or more points on a trailer and the one or more points are used to determine a characteristic of the trailer;

the characteristic is a position of the coupler;

the characteristic is a heading direction of the trailer;

the one or more points include a first point indicative of the coupler, a second point indicative of a first corner of the trailer, and a third point indicative of a second corner of the trailer; and/or a length of the coupler is calculated based on a relationship between the first, second, and third points.

Moreover, a hitch assist method is provided herein. The method includes determining an environmental visibility level. The method also includes determining an offset from a first sensor in high visibility levels and from a second sensor in low visibility levels. The method further includes localizing and mapping two or more points relative to one another indicative of a trailer. Lastly, the method includes controlling a vehicle along a path to align a hitch ball with a coupler of the trailer. Examples of the hitch assist method can include any one or a combination of the following features:

determining a position of the coupler based on the two or more points;

determining a heading direction of the trailer based on the two or more points;

the two or more points include a first point indicative of the coupler, a second point indicative of a first corner of the trailer, and a third point indicative of a second corner of the trailer;

the first sensor is an imager and the second sensor is a proximity sensor; and/or the localizing and mapping is conducted simultaneously to detect objects proximate a vehicle.

According to some examples, a hitch assist system is provided herein. The hitch assist system includes a sensor configured to operate in a substantially similar accuracy during high and low visibility conditions. The hitch assist system further includes a controller for localizing and mapping objects proximate a vehicle in response to sensor signals provided by the sensor and maneuvering the vehicle along a path to align a hitch ball with a coupler of a trailer. Examples of the hitch assist system can include any one or a combination of the following features:

the localizing and mapping are configured to locate one or more points on a trailer and the points are used to determine a characteristic of the trailer;

the characteristic is a position of the coupler; and/or the characteristic is a heading direction of the trailer.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer.

Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It will be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It will be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A hitch assist system comprising:
   a sensing system configured to detect a trailer proximate a vehicle; and
   a controller for:
   determining an environmental visibility level;
   determining an offset from a first sensor in high visibility levels and from a second sensor in low visibility levels; and
   maneuvering the vehicle along a path to align a hitch ball with a coupler of the trailer, wherein the controller uses sensor signals from the second sensor to conduct a simultaneous localization and mapping (SLAM) process of an area proximate the vehicle, and wherein the SLAM process is configured to locate one or more points on a trailer and the one or more points are used to determine a characteristic of the trailer.

2. The hitch assist system of claim 1, wherein the first sensor is an imager and the second sensor is a proximity sensor.

3. The hitch assist system of claim 2, wherein the proximity sensor is a radio detection and ranging (radar) sensor.

4. The hitch assist system of claim 1, wherein the second sensor is disposed within a vehicle bumper and has a field of view rearwardly of the vehicle.

5. The hitch assist system of claim 1, wherein the characteristic is a position of the coupler.

6. The hitch assist system of claim 1, wherein the characteristic is a heading direction of the trailer.

7. The hitch assist system of claim 1, wherein the one or more points include a first point indicative of the coupler, a second point indicative of a first corner of the trailer, and a third point indicative of a second corner of the trailer.

8. The hitch assist system of claim 1, wherein a length of the coupler is calculated based on a relationship between the first, second, and third points.

9. A hitch assist method comprising the steps of:
determining an environmental visibility level;
determining an offset from a first sensor in high visibility levels and from a second sensor in low visibility levels;
localizing and mapping two or more points relative to one another indicative of a trailer; and
controlling a vehicle along a path to align a hitch ball with a coupler of the trailer, wherein the two or more points include a first point indicative of the coupler, a second point indicative of a first corner of the trailer, and a third point indicative of a second corner of the trailer.

10. The hitch assist method of claim 9, further comprising:
determining a position of the coupler based on the two or more points.

11. The hitch assist method of claim 9, further comprising:
determining a heading direction of the trailer based on the two or more points.

12. The hitch assist method of claim 9, wherein the first sensor is an imager and the second sensor is a proximity sensor.

13. The hitch assist method of claim 12, wherein the localizing and mapping is conducted simultaneously to detect objects proximate a vehicle.

14. A hitch assist system comprising:
a sensor configured to operate in a substantially similar accuracy during high and low visibility conditions; and
a controller for:
localizing and mapping objects proximate a vehicle in response to sensor signals provided by the sensor; and
maneuvering the vehicle along a path to align a hitch ball with a coupler of a trailer, wherein the characteristic is a heading direction of the trailer.

15. The hitch assist system of claim 14, wherein the localizing and mapping are configured to locate one or more points on a trailer and the points are used to determine a characteristic of the trailer.

16. The hitch assist system of claim 15, wherein the characteristic is a position of the coupler.

* * * * *